United States Patent
Ohtsuji

(10) Patent No.: US 7,461,631 B2
(45) Date of Patent: *Dec. 9, 2008

(54) TRANSMISSIBLE CONNECTING MECHANISM BETWEEN VALVE SHAFTS FORMING ANGLE

(75) Inventor: Takamasa Ohtsuji, Saitama (JP)

(73) Assignee: Husqvarna Zenoah Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/578,082

(22) PCT Filed: Nov. 12, 2004

(86) PCT No.: PCT/JP2004/016863

§ 371 (c)(1),
(2), (4) Date: May 3, 2006

(87) PCT Pub. No.: WO2005/047672

PCT Pub. Date: May 26, 2005

(65) Prior Publication Data

US 2007/0107693 A1    May 17, 2007

(30) Foreign Application Priority Data

Nov. 12, 2003  (JP) ............................ 2003-382615

(51) Int. Cl.
*F02D 9/02* (2006.01)
*F02D 11/04* (2006.01)

(52) U.S. Cl. .................. 123/400; 123/342; 123/336; 261/41.3

(58) Field of Classification Search ................. 123/336, 123/337, 73 A, 73 AD, 398, 400, 442, 342; 261/23.1, 23.2, 41.1, 41.2, 41.3
See application file for complete search history.

(56) References Cited

U.S. PATENT DOCUMENTS

| 3,439,658 | A |   | 4/1969 | Simonet |
| 4,075,985 | A |   | 2/1978 | Iwai |
| 4,414,162 | A | * | 11/1983 | Ii et al. ...................... 261/23.2 |
| 5,394,846 | A | * | 3/1995 | Jaeger et al. ................ 123/336 |
| 5,553,579 | A | * | 9/1996 | Yoshida et al. .............. 123/295 |
| 5,964,203 | A | * | 10/1999 | Sato et al. ................... 123/396 |
| 6,202,989 | B1 | * | 3/2001 | Pattullo ....................... 261/52 |
| 6,216,650 | B1 |   | 4/2001 | Noguchi |

(Continued)

FOREIGN PATENT DOCUMENTS

GB        359019        10/1931

(Continued)

*Primary Examiner*—Hai H Huynh
(74) *Attorney, Agent, or Firm*—Darby & Darby P.C.

(57) ABSTRACT

A transmissible connecting mechanism having a cam plate and a lever are attached respectively to a lead air control valve shaft and an air-fuel mixture throttle valve shaft which are arranged so as to form an angle. A length of a contact element provided in the lever is extended in parallel to an axis of the air-fuel mixture throttle valve shaft, and the length of the contact element is such that the contact element and a cam surface formed in a cam plate are always brought into contact with each other. The lead air control valve shaft and the air-fuel mixture throttle valve shaft of the carburetor are connected in a transmissible manner, and it is possible to make a stratified scavenging two-cycle engine compact.

4 Claims, 7 Drawing Sheets

U.S. PATENT DOCUMENTS

| | | |
|---|---|---|
| 6,328,288 B1 * | 12/2001 | Gerhardy ..................... 261/35 |
| 6,347,787 B1 | 2/2002 | Tobinai et al. |
| 6,415,750 B2 | 7/2002 | Rosskamp et al. |
| 6,418,891 B2 | 7/2002 | Kobayashi |
| 6,439,547 B1 * | 8/2002 | King et al. ................... 261/52 |
| 6,484,695 B1 * | 11/2002 | Cobb, Jr. .................... 123/438 |
| 6,561,861 B2 * | 5/2003 | Ikuma et al. .............. 440/88 A |
| 6,591,794 B2 * | 7/2003 | Toda ......................... 123/73 A |
| 6,708,958 B1 * | 3/2004 | Warfel et al. ................. 261/45 |
| 6,761,145 B2 * | 7/2004 | Matsuda et al. ............ 123/342 |
| 6,769,396 B2 * | 8/2004 | Geyer et al. ................ 123/336 |
| 6,877,723 B2 * | 4/2005 | Martinsson et al. ........ 261/23.3 |
| 6,896,245 B2 * | 5/2005 | Suzuki et al. .............. 261/23.2 |
| 6,928,996 B2 * | 8/2005 | Tobinai ...................... 123/586 |
| 6,957,633 B2 * | 10/2005 | Toda et al. ................ 123/65 R |
| 7,100,588 B2 * | 9/2006 | Lee ............................ 123/585 |
| 7,104,253 B1 * | 9/2006 | Dow et al. .................. 123/342 |
| 7,104,527 B2 * | 9/2006 | Koizumi ...................... 261/52 |
| 7,144,000 B2 * | 12/2006 | Roth et al. ................. 261/39.3 |
| 7,146,941 B2 * | 12/2006 | Ohtsuji ..................... 123/65 V |
| 2003/0011081 A1 | 1/2003 | Martinsson et al. |
| 2003/0213464 A1 | 11/2003 | Geyer et al. |
| 2006/0137653 A1 * | 6/2006 | Amend et al. ............... 123/400 |
| 2007/0068488 A1 * | 3/2007 | Ohtsuji ...................... 123/342 |

FOREIGN PATENT DOCUMENTS

| | | |
|---|---|---|
| JP | 52-76522 | 6/1977 |
| JP | 55-4518 | 2/1980 |
| JP | 9-268917 | 10/1997 |
| JP | 9-268918 | 10/1997 |
| JP | 10-252565 | 9/1998 |
| JP | 2000-028009 | 1/2000 |
| JP | 2000-186559 | 7/2000 |
| JP | 2000-282874 | 10/2000 |
| JP | 2000-314350 | 11/2000 |
| JP | 2001-254623 | 9/2001 |
| JP | 2001-263072 | 9/2001 |
| WO | WO 98/17902 | 4/1998 |
| WO | WO 01/51782 A1 | 7/2001 |

* cited by examiner

TRANSMISSIBLE CONNECTING MECHANISM BETWEEN VALVE SHAFTS FORMING ANGLE

CROSS REFERENCE TO RELATED APPLICATIONS

This is a U.S. national phase application under 35 U.S.C. §371 of International Patent Application No. PCT/JP2004/016863, filed Nov. 12, 2004 and claims the benefit of Japanese Application 2003-382615, filed Nov. 12, 2003. The International Application was published on May 26, 2005 as International Publication No. WO 2005/047672 under PCT Article 21(2).

TECHNICAL FIELD

The present invention relates to a transmissible connecting mechanism interlocking and driving a lead air control valve shaft and an air-fuel mixture throttle valve shaft of a carburetor of a stratified scavenging two-cycle engine in which the shafts are arranged while forming an angle such as an oblique state, a twisted state or the like.

BACKGROUND ART

Conventionally, a combustion control in an optimum state is executed while always keeping a balance between an amount of the air-fuel mixture and an amount of the lead air, by interlocking and driving the lead air control valve shaft and the air-fuel mixture throttle valve shaft of the carburetor of the stratified scavenging two-cycle engine.

The stratified scavenging two-cycle engine is structured such that a lead air precedently having flown into a cylinder in a scavenging stroke is flown out to an exhaust port together with a combustion gas, and an air-fuel mixture flowing into the cylinder after the lead air can be stored within the cylinder. Accordingly, it is possible to prevent a so-called short circuiting phenomenon, that is, the air-fuel mixture flowing into the cylinder is discharged to an atmospheric air from the exhaust port together with the combustion gas, it is possible to widely reduce an exhaust gas concentration, and it is possible to reduce a dissipation of a specific fuel consumption.

A transmissible connecting mechanism is used as a control mechanism which can obtain an optimum opening degree of the lead air control valve with respect to an opening degree of the throttle valve in the carburetor, for controlling a timing at which the lead air and the air-fuel mixture are flown into the cylinder, an inflow amount and the like. As a transmissible connection between a lead air control valve shaft and an air-fuel mixture throttle valve shaft of a carburetor in which both the valve shafts are arranged in a parallel state, for example, there has been proposed a diaphragm carburetor using a cam mechanism and a link mechanism, by Japanese Patent Application Laid-Open (JP-A) No. 2000-314350 (patent document 1).

The diaphragm carburetor described in JP-A No. 2000-314350 is provided with a structure shown in FIG. 8. In other words, an operation lever 66 is borne in one end of a throttle valve shaft 63 of a throttle valve (not shown) arranged within a carburetor casing 60. The operation lever 66 is arranged in one end 67 of the throttle valve shaft 63 so as to be relatively non-rotatable, and is elastically energized in a valve closing direction of the throttle valve 62 via a restoring spring 68. Further, the operation lever 66 is connected to a carburetor control cable or a similar structure thereto in accordance with a non-illustrated aspect, and can regulate an opening degree of a throttle valve (not shown) arranged within the carburetor casing 60.

A lever 69 is borne to the other end 67' of the throttle valve shaft 63 so as to be relatively non-rotatable as shown in FIG. 9. In the same manner, a lever 71 is borne to an end portion 70 of a shaft 65 of the lead air control valve. The throttle valve shaft 63 and the shaft 65 of the leading air control valve are arranged in parallel, and the levers 69 and 71 are connected to each other via the drawbar 72. One end of the drawbar 72 is rotatably engaged with the lever 71, and the other end is arranged within a vertical slit 74 provided in a lever 69 so as to extend approximately in a rotational direction 73. Accordingly, a link mechanism serving as a transmissible connecting portion 76 is structured by the levers 69 and 71 and the drawbar 72.

The transmissible connecting portion 76 formed between the shaft 65 of the lead air control valve and the throttle valve 63 is driven by a rotation of the throttle valve shaft 63, and the connection between the lead air control valve and the throttle valve 62 of the carburetor is achieved dependently on a position. As shown in FIG. 12, the restoring spring 68 is applied to the throttle valve shaft 63 in a valve closing direction of the throttle valve 62, and a coil spring 75 is correspondingly to the shaft 65 of the lead air control valve. The coil spring 75 determines a valve closing position of a butterfly-shaped throttle valve structured as the lead air control valve. As shown in FIG. 13, home positions of the throttle valve shaft 63 and the shaft 65 of the lead air control valve can be respectively determined by the restoring spring 68 and the coil spring 75.

As a structure of the cam mechanism serving as the transmissible connecting portion 76, as shown in FIG. 10, the levers 69' and 71' having the cam profile portion 80 and the cam profile portion 81 are respectively attached to the throttle valve shaft 63 and the shaft 65 arranged in parallel. In the case that the throttle valve 63 is moved against a force of the restoring spring 68 in the valve opening direction 73 together with the throttle valve within the carburetor, the shaft 65 of the lead air control valve is structured such as not to be operated at a time of an idling and in an idling lower range until an idling path portion 77 between a free end 79 of the lever 69' and a free end 78 of the lever 71' is overcome.

When the cam profile portion 80 of the free end 79 is brought into contact with the cam profile portion 81 of the free end 78, the throttle valve 62 within a intake pipe line 61 already exists at a partial load position. If the throttle valve 62 is further opened at this time point, the shaft 65 of the lead air control valve is taken in the valve opening direction 73, and a regulating distance at that time can be determined by the cam profile portions 80 and 81 of the vertical edges of the levers 69' and 71'.

Patent document 1: Japanese Patent Application Laid-Open (JP-A) No. 2000-314350

DISCLOSURE OF THE INVENTION

Problems to be Solved by the Invention

In a stratified scavenging two-cycle engine, in order to further reduce an exhaust gas component, it is necessary to increase an amount of a lead air. Accordingly, it is possible to increase the amount of the lead air by making a diameter of a lead air pipe line large, however, there is generated a problem that a volumetric capacity of a structure becomes large by making the diameter of the lead air pipe line large.

Further, it is possible to make an area of the pipe line equal to or more than the case that the diameter of the lead air pipe line is increased, by increasing the number of the lead air pipe line. However, in the case that the air-fuel mixture throttle valve shaft of the carburetor and the lead air control valve shaft are in a parallel state, there is a problem that the structure area becomes large in the same manner as the case that the diameter of the lead air pipe line is increased by increasing the number of the lead air pipe line.

In order to solve the problem, a countermeasure that the lead air control valve shaft and the air-fuel mixture throttle valve shaft of the carburetor are structured in a layout forming an angle such as an oblique state, a twisted state or the like is proposed by the applicant of the present invention. In the case that the lead air control valve shaft and the air-fuel mixture throttle valve shaft of the carburetor are arranged in the oblique state or the twisted state, the structure of the transmissible connecting mechanism for connecting between both the valve shafts in a transmissible manner comes in to question. The present invention provides a transmissible connecting mechanism between valve shafts forming an angle, which is provided for solving the problem in the structure of the transmissible connecting mechanism.

In the invention described in the patent document 1, the link mechanism or the cam mechanism is used as the transmissible connecting mechanism between the lead air control valve shaft and the throttle valve shaft of the carburetor, and the link mechanism and the cam mechanism form the transmissible connecting mechanism in which the lead air control valve shaft and the throttle valve shaft of the carburetor are arranged in the parallel state. Accordingly, in the case of increasing the lead air amount, there is generated a problem that the structure area becomes large as mentioned above.

In the meantime, the patent document 1 describes in page 4, paragraph 0018 that "as shown FIG. 3 (FIG. 8 in the present application) to FIG. 5 (FIG. 10 in the present application), a throttle valve shaft 7 in the illustrated embodiment (a throttle valve shaft 63 in the present application) and a shaft 24 (a shaft 65 in the present application) of a throttle mechanism 14 (a throttle valve 64 in the present application) of an air pipe 15 (not shown in the present application) are approximately in parallel to each other, however, if they are arranged so as to form an angle with each other, the object is achieved." (in agreement of the original text, the words in parentheses indicate terms and reference numerals used in (background art) in the present application).

However, in the case of arranging the throttle valve shaft and the shaft of the throttle mechanism of the air pipe described in the patent document 1 so as to form the angle with each other, the transmissible connecting mechanism connecting between both the valve shafts in the transmissible manner does not execute a two-dimensional operation such as the link mechanism and the cam mechanism described in the patent document 1, but executes a three-dimensional operation. Therefore, even if the link mechanism and the cam mechanism described in the patent document 1 are arranged between the throttle valve shaft 63 and the shaft 65 so as to form the angle, the link mechanism and the cam mechanism can not normally operate, and the transmissible connection can not be executed between the throttle valve shaft 63 and the shaft 65 forming the angle.

Further, the patent document 1 describes that the object is achieved even by arranging the throttle valve shaft and the shaft of the throttle mechanism of the air pipe so as to form the angle as mentioned above, however, neither discloses nor describes the structure and the countermeasure by which the link mechanism and the cam mechanism are three-dimensionally operated in the case of arranging the throttle valve shaft and the shaft of the throttle mechanism of the air pipe so as to form the angle with each other. Further, the problem in the three-dimensional motion is not recognized.

A main object of the present invention is to provide a transmissible connecting mechanism which can structure a stratified scavenging two-cycle engine in compact without making a sacrifice of a field product in a height direction of the stratified scavenging two-cycle engine, in the case that a lead air control valve shaft and an air-fuel mixture throttle valve shaft of a carburetor form an angle.

MEANS OF SOLVING THE PROBLEMS

Problems described above is solved by means of base structure of the invention, wherein the case structure is a transmissible connecting mechanism between valve shafts forming an angle setting one valve shaft of a lead air control valve shaft and a valve shaft of an air-fuel mixture throttle valve of a carburetor in a stratified scavenging two-cycle engine to a drive shaft and the other valve shaft to a driven shaft, driving both the valve shafts in an interlocking manner, wherein the drive shaft and the driven shaft are arranged so as to form an angle, the transmissible connecting mechanism is arranged so as to be integrally rotatable with the drive shaft and the driven shaft respectively, and is provided with a pair of first cam member and a second cam member which are transmitted to each other in a contact manner, and a part of a contact surface of the first cam member and a part of a contact surface of the second cam member are always maintained a contact state at a time of transmitting the contact of the first cam member and the second cam member.

In addition, according to the preferred embodiment of the present invention, one cam member of the first cam member and the second cam member is constituted by a cam plate having a cam surface, the other cam member is constituted by a lever having a contact element which is brought into contact with the cam surface. Further in the present invention, it is preferred that at least one cam member of the first cam member and the second cam member is structured such that the contact surface with the other cam member is extended in parallel to the valve shaft in which the one cam member is arranged. And it may be that at least one cam member of the first cam member and the second cam member is slidably energized along the drive shaft or the driven shaft in which the first cam member or the second cam member is arranged, and toward the other second cam member or the first cam member.

EFFECTS OF THE INVENTION

According to the present invention, in the transmissible connecting mechanism driving in the interlocking manner the lead air control valve shaft and the air-fuel mixture throttle valve shaft of the carburetor of the stratified scavenging two-cycle engine in which the shafts are arranged so as to form the angle, one valve shaft of the lead air control valve shaft and the air-fuel mixture throttle valve shaft is formed as the drive shaft, and the other valve shaft is formed as the driven shaft. Further, a pair of first cam member and second cam member respectively arranged in the drive shaft and the driven shaft are structured such that the contact state between a part of the contact surface of the first cam member and a part of the contact surface of the second cam member is always maintained.

Accordingly, it is possible to connect between the lead air control valve shaft and the air-fuel mixture throttle valve shaft which are arranged so as to form the angle in the transmissible manner via the first cam member and the second cam member. Further, since apart of the contact surface of the first cam member and a part of the contact surface of the second cam member always maintain the contact state, the first cam member and the second cam member interfere with each other at a time when the lead air control valve shaft and the air-fuel mixture throttle valve shaft rotate, and both the contact surfaces are in the non-contact state, whereby it is possible to prevent the rotation of the valve shaft from being obstructed.

Further, since it is possible to arrange the lead air control valve shaft and the air-fuel mixture throttle valve shaft so as to form the angle, it is possible to achieve the structure without increasing the field area of the stratified scavenging two-cycle engine even if a plurality of lead air pipe lines are arranged in order to increase the amount of the lead air. In particular, even in the case that the valve shafts are close to each other, it is possible to securely transmit the rotation of the drive shaft to the driven shaft by the transmissible connecting mechanism between the valve shafts forming the angle, on the basis of using a pair of first cam member and second cam member.

The first cam member and the second cam member can be constituted by a cam plate having a cam surface, and a lever having a contact element brought into contact with the cam surface, or can be constituted by the cam plates respectively having the cam surfaces.

In the case of using the contact element, the structure may be made such that a pin or a rotation roll serving as the contact element is attached to a portion near an end portion of the lever. Alternatively, it is possible to form a bent portion formed by bending an apical end portion of the lever, an inflected portion integrally formed with the lever or the like as the contact element. It is possible to reduce a sliding resistance generated between the contact element and the cam surface, by structuring a shape of the contact element such as a cylinder shape, a spherical shape, a rotation roll shape or the like so that the contact element and the cam surface are brought into line contact or point contact with each other.

As the cam surface formed in the cam plate, in addition to the cam surface formed in the outer peripheral profile portion of the cam plate, it is possible to form a cam groove in the cam plate so as to use an inner surface of the cam groove as the cam surface. In the case that the cam groove is formed in the cam plate, it is possible to always bring one of the inner peripheral surfaces of the cam groove into contact with the contact element at a time or rotating the drive shaft in the reciprocating manner. Accordingly, even when the foreign particle or the like enters into the lead air control valve shaft or the air-fuel mixture throttle valve shaft and valve shaft does not normally function, it is possible to utilize the return spring forces of the springs respectively arranged in the lead air valve shaft and the air-fuel mixture throttle valve shaft as the resultant force, and it is possible to apply to the respective valve shaft by using the resultant force.

Therefore, in the case that the cam groove is formed in the cam plate, it is possible to rotate both the valve shafts in the valve closing direction on the basis of the return force applied to the other valve shaft even if one valve shaft does not normally function. Further, since it is possible to utilize the return spring forces of the respective springs as the resultant force so as to rotate both the valve shafts in the valve closing direction, it is possible to make the spring forces of the springs arranged in both the valve shafts small, and it is possible to reduce the throttle operation load for operating the opening and closing operation of the throttle valve of the carburetor.

Further, even in the case that both the valve shafts can not be returned by combining the return spring forces of the springs at a time when one valve shaft generates a malfunction, for example, even in the case that a malfunction is generated in the valve shaft of the lead air control valve and the valve shaft stops in a state in which the lead air control valve is open, the opening degree of the air-fuel mixture throttle valve is maintained in which the opening degree is corresponding to the opening degree of the lead air control valve. Accordingly, it is possible to supply a proper fuel corresponding to the lead air amount to the cylinder.

As the structure of the transmissible connecting mechanism between the valve shafts forming the angle, the structure can be made such that the shape of the contact surface brought into contact with the other cam member in at least one cam member of the first cam member and the second cam member is formed as a shape extending in parallel to the valve shaft in which the one cam member is arranged.

Accordingly, the motion between the first cam member and the second cam member is three-dimensional, it is possible to always keeps a part of the contact surface of the first cam member in contact with a part of the contact surface of the second cam member, and it is possible to securely transmit the rotation of the drive shaft to the driven shaft.

In other words, for example, if the first cam member is arranged in the driven shaft, the first cam member is constituted by a cam plate having a cam surface, the second cam member is arranged in the drive shaft, and the second cam member is constituted by a lever having a contact element brought into contact with the cam surface, it is possible to form the cam surface in a shape extending in parallel to the driven shaft. Alternatively, the first cam member or the second cam member can be structured by arranging the contact element, for example, formed by a pin or the like extended in parallel to the drive shaft in the lever.

Further, as the structure of the transmissible connecting mechanism between the valve shafts forming the angle, the structure may be made such that at least one cam member of the first cam member and the second cam member is slidably arranged along the drive shaft or the driven shaft in which the one cam member is arranged, and the one cam member is energized in a direction toward the other cam member.

Accordingly, since at least one cam member is always energized in a direction of moving close to the other cam member, and is arranged so as to be slidable along the shaft in which the one cam member is arranged, it is possible to keep the first cam member and the second cam member in a contact transmissible state even if the contact position between the first cam member and the second cam member is three-dimensionally changed in accordance with the rotation of the drive shaft. Therefore, even if the first cam member and the second cam member three-dimensionally moves, it is possible to always keep a par of the contact surface of the first cam member and a part of the contact surface of the second cam member in a contact state, and it is possible to transmit the rotation of the drive shaft to the driven shaft.

As the cam member slid in the axial direction, it is possible to slide one cam member of the first cam member and the second cam member, or it is possible to energize slidably the first cam member and the second cam member in a direction coming close to each other. As an energizing means for energizing the cam member in the axial direction, a coil spring or the like can be employed. Further, the coil spring or the like used as the energizing means can be used as a return spring for energizing the lead air control valve and/or the air-fuel mixture throttle valve in a close direction.

Figure 1:
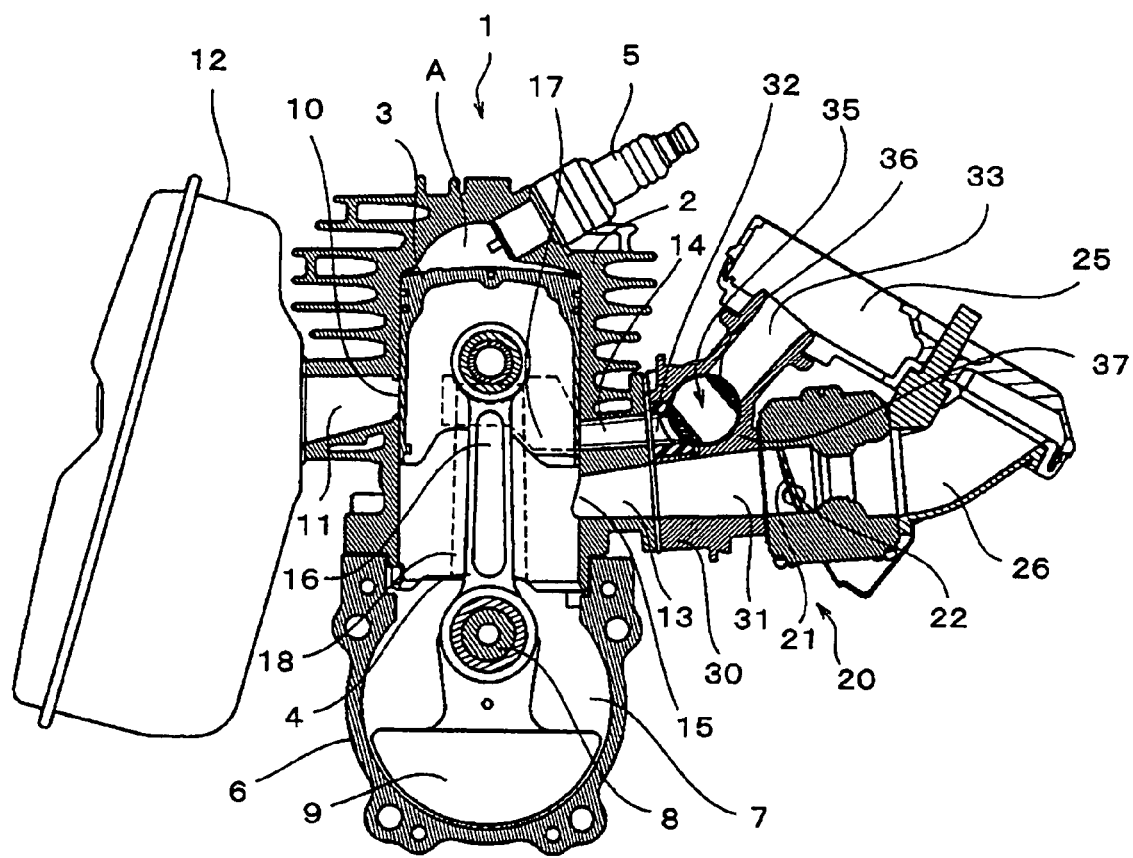
[FIG. 1] It is a schematic front elevational cross sectional view showing a general view of the present invention (embodiment).

DESCRIPTION OF REFERENCE NUMERALS 1 stratified scavenging two-cycle engine
2 cylinder
3 piston
6 crank case
7 crank chamber
8 crank shaft
10 exhaust port
15 intake port
16 scavenging port
20 carburetor
20a carburetor main body
21 air-fuel mixture throttle valve
22 valve shaft
23 lever
24, 24' contact element
27 valve shaft
28 cam plate
28a, 28b cam surface
35 rotary valve
40 projection
45, 45' spring
46, 46' spring
60 carburetor casing
62 throttle valve
63 throttle valve shaft
64 throttle valve
65 shaft
66 operation lever
68 restoring spring
69, 69' lever
71, 71' lever
72 drawbar
74 vertical slot
75 coil spring
76 transmissible connecting portion
77 idling path portion
80, 81 cam profile portion
82 diaphragm carburetor
A cylinder chamber

BEST MODE FOR CARRYING OUT THE INVENTION

A description will be concretely given below of a preferable embodiment in accordance with the present invention with reference to the accompanying drawings. A description will be given below of a transmissible connecting mechanism in accordance with the present invention on the basis of an embodiment in which a rotary valve is used as a lead air control valve for a lead air in a stratified scavenging two-cycle engine. A throttle valve such as a butterfly type throttle valve or the like can be employed as the lead air control valve in accordance with the present invention. Further, a description will be given of a structure in which the butterfly type throttle valve is employed as an air-fuel mixture throttle valve in a carburetor, however, a throttle valve such as a rotary valve or the like can be used as the air-fuel mixture throttle valve.

A structure of the stratified scavenging two-cycle engine or the like described below will be described as a typical structure of the stratified scavenging two-cycle engine or the like, and the transmissible connecting mechanism according to the present invention can be applied to a stratified scavenging two-cycle engine having the other structure.

A cam shape and a shape of a contact element in the transmissible connecting mechanism in accordance with the present invention can employ various shapes and layout relations as far as they can achieve the object of the present invention, in addition to a shape and a layout relation described below. Accordingly, the present invention is not limited to the embodiment described below, but can be variously modified.

Figure 2:
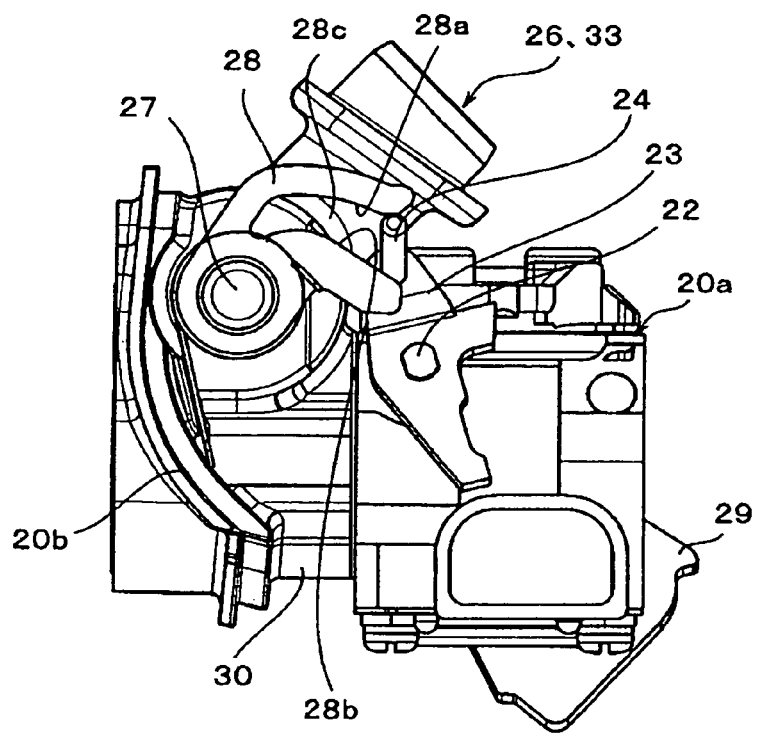
[FIG. 2] It is a plan view of a transmissible connecting mechanism (first embodiment).
Figure 3:
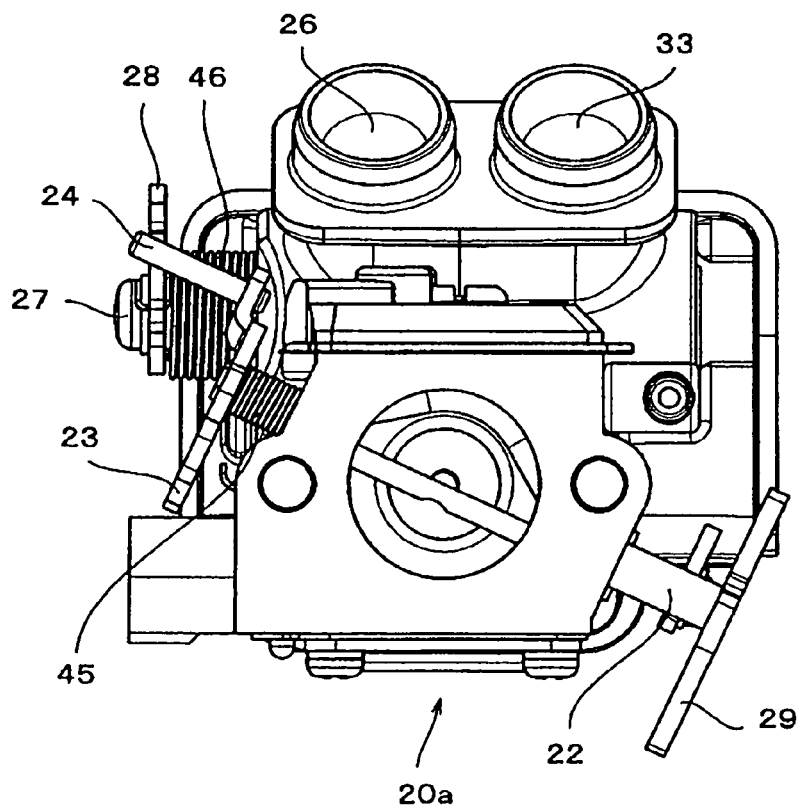
[FIG. 3] It is a side elevational view as seen front a leftward direction in FIG. 2 (first embodiment).
Figure 4:
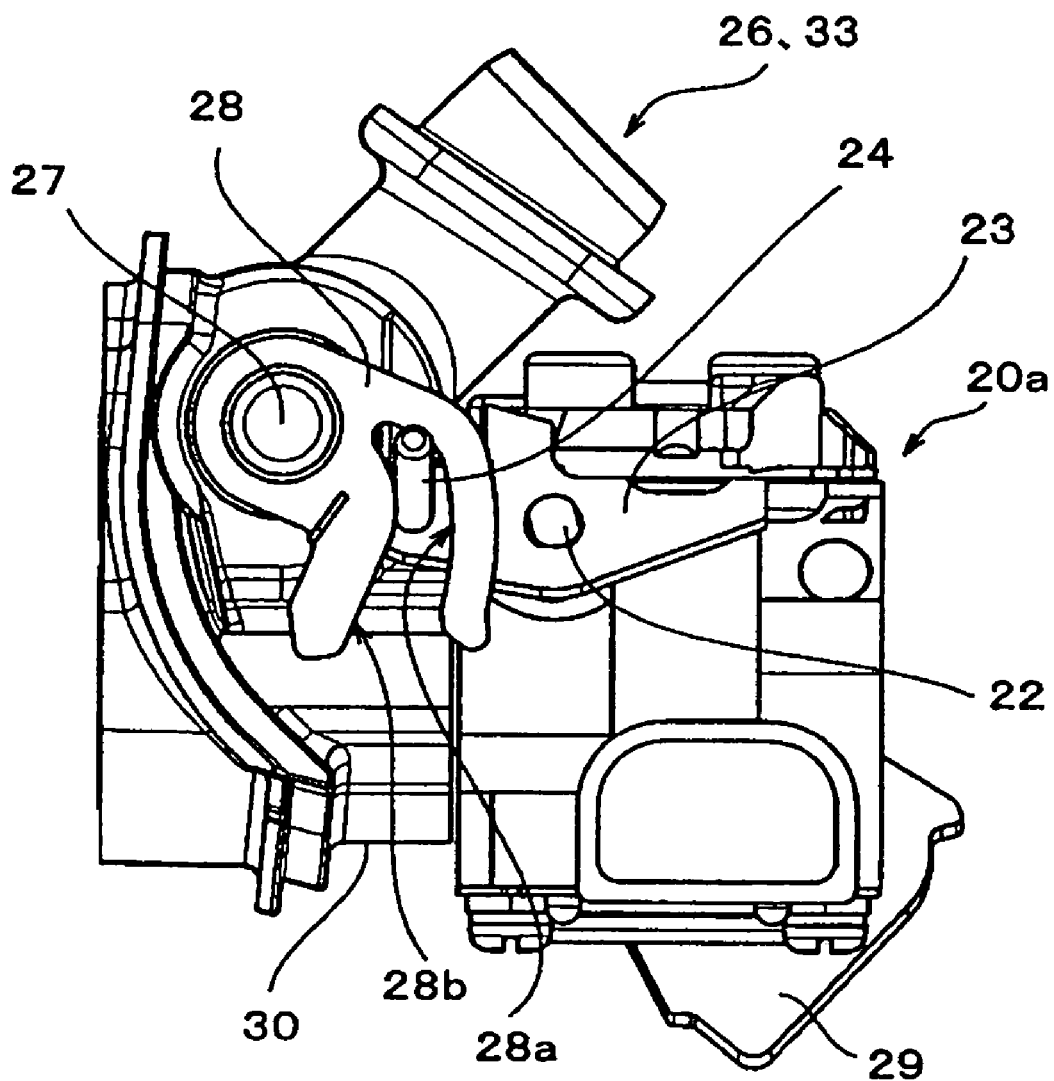
[FIG. 4] It is a plan view in an operation state of the transmissible connecting mechanism (first embodiment).
Figure 5:
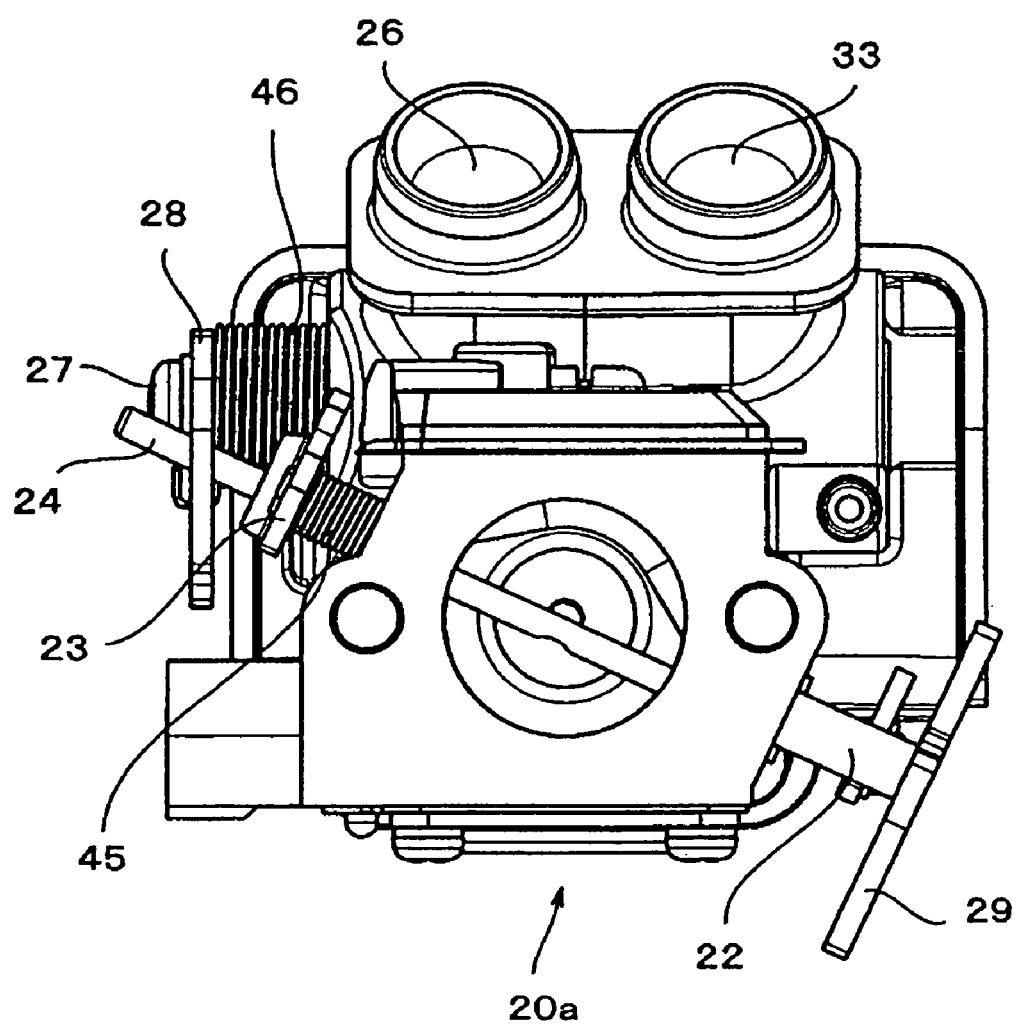
[FIG. 5] It is a side elevational view as seen from a leftward direction in FIG. 4 (first embodiment).
Figure 6:
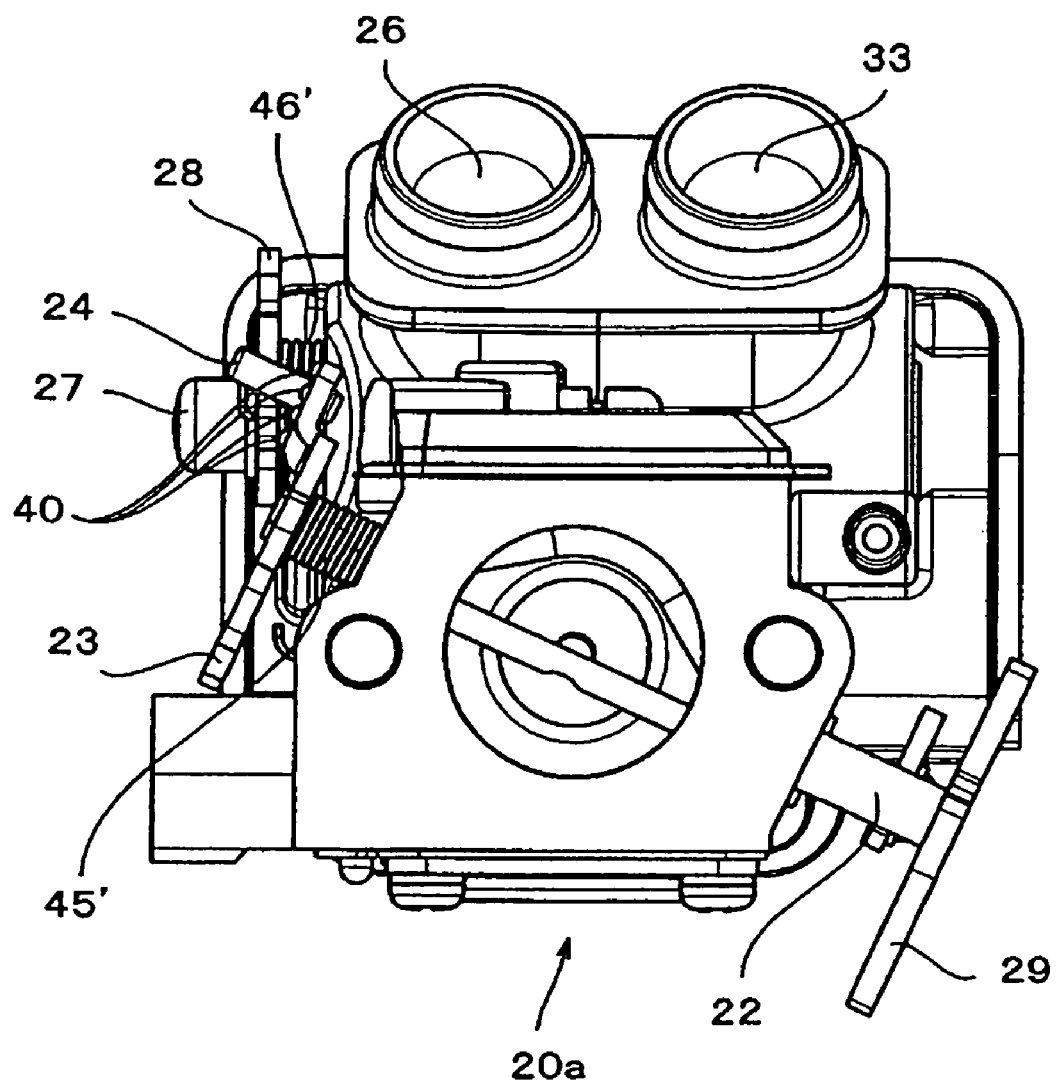
[FIG. 6] It is a plan view showing the other embodiment of the transmissible connecting mechanism (second embodiment).
Figure 7:
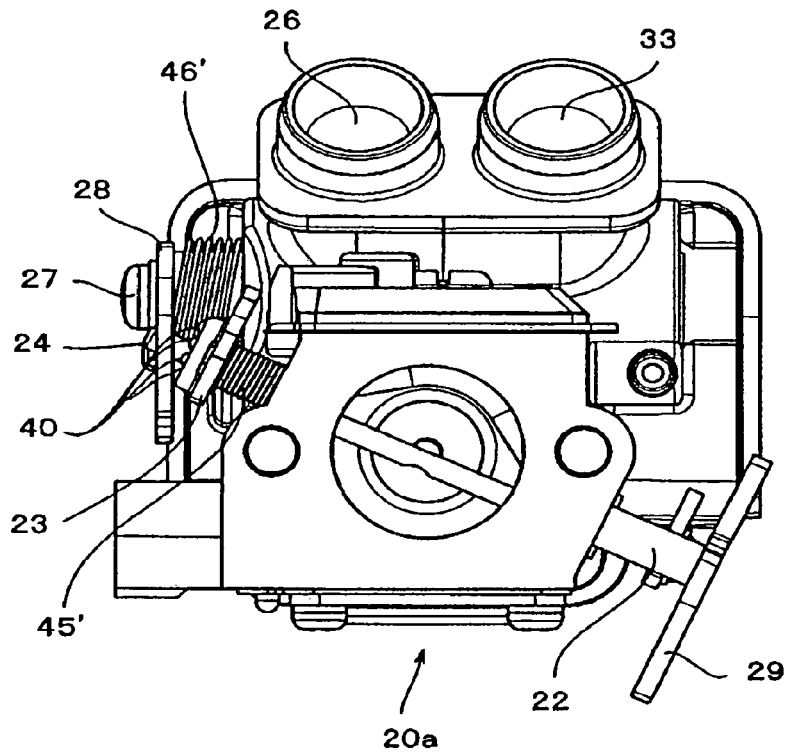
[FIG. 7] It is a plan view showing an operation state in the other embodiment (second embodiment).
Figure 8:
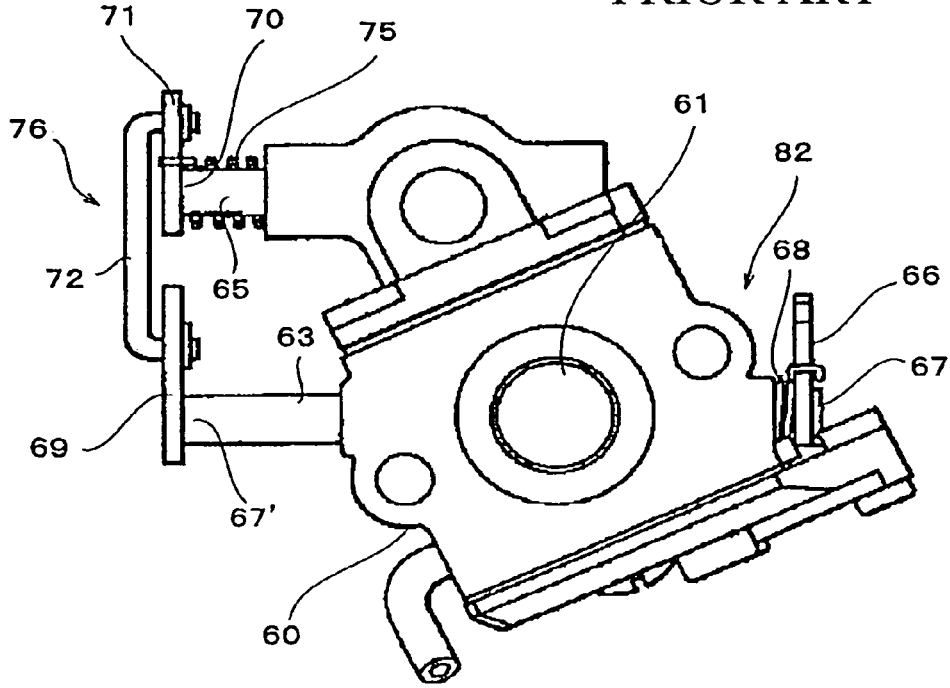
[FIG. 8] It is a plan view of a diaphragm carburetor in accordance with a prior art (prior art).
Figure 9:
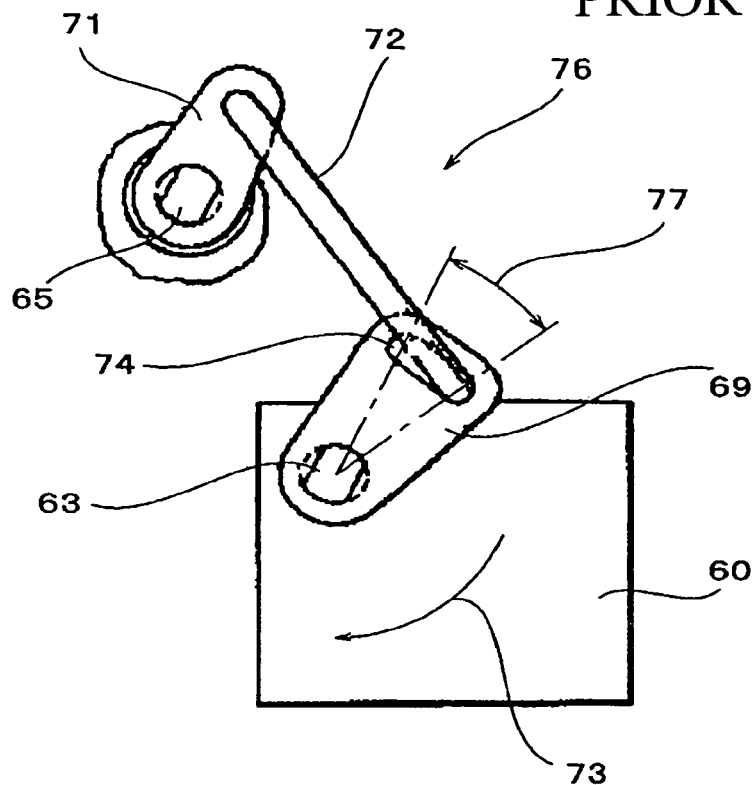
[FIG. 9] It is a plan view as seen from a leftward direction in FIG. 8 (prior art).
Figure 10:
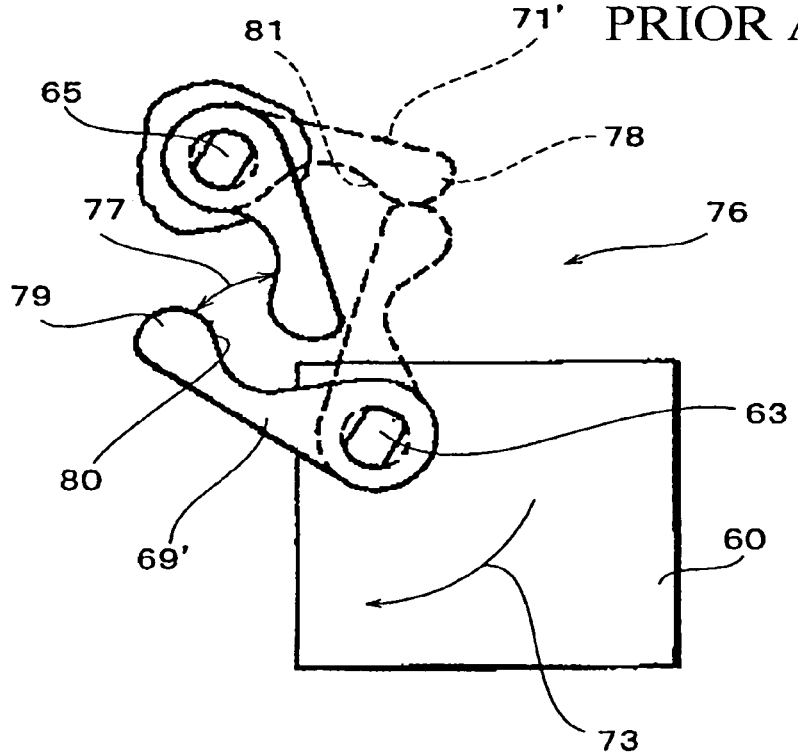
[FIG. 10] It is a plan view showing a cam mechanism in accordance with the prior art (prior art).

FIG. 1 is a front elevational cross sectional view of a stratified scavenging two-cycle engine in accordance with an embodiment of the present invention. FIG. 2 is a plan view showing a transmissible connecting mechanism. FIG. 3 is a side elevational view as seen front a leftward direction in FIG. 2. FIG. 4 is a plan view showing an operation state of the transmissible connecting mechanism. FIG. 5 is a side elevational view as seen from a leftward direction in FIG. 4. FIGS. 6 and 7 are plan views showing an operation state of a transmissible connecting mechanism in accordance with the other embodiment.

First Embodiment

As shown in FIG. 1, as a stratified scavenging two-cycle engine 1, a piston 3 is slidably fitted to a cylinder 2 attached to an upper portion of a crank case 6. One end of a crank 9 rotatably borne within a crank chamber 7 is connected to a crank shaft 8 rotatably attached to a crank case 6, and the piston 3 is connected via a connecting rod 4. Further, a spark plug 5 is attached to a top portion of the cylinder 2.

An exhaust port 10 opening to an inner wall surface of the cylinder 2 is connected to a muffler 12 via an exhaust flow path 11. A scavenging port 16 opens to a portion slightly below the exhaust port 10, in the inner wall surface of the cylinder 2. The scavenging port 16 is communicated with the crank chamber 7 by a scavenging flow path 18. Further, the scavenging port 16 is communicated with a first lead air flow path 14 communicated with a rotary valve 35 serving as a lead air control valve via a piston groove 17 provided in an outer peripheral portion of the piston 3.

An intake port 15 opening to the crank chamber 7 is formed in a lower portion of the inner wall surface of the cylinder 2, and the intake port 15 is communicated with a second intake flow path 31 communicating with a carburetor 20 via a first intake flow path 13.

The first intake flow path 13 and the first lead air flow path 14 are respectively connected to the second intake flow path 31 and a second lead air flow path 32 which are formed in an insulator 30 aiming at a heat insulation. Further, the rotary valve 35 serving as the lead air control valve is arranged in the insulator 30, and the rotary valve 35 rotates around a valve shaft 27 shown in FIG. 2. Further, a third lead air flow path 33 connected to the rotary valve 35 is formed in the insulator 30.

The second intake flow path 31 formed in the insulator 30 is connected to the carburetor 20, and the carburetor 20 is connected to a fuel tank (not shown) and an air cleaner 25. Further, a third lead air flow path 33 formed in the insulator 30 is connected to the air cleaner 25.

A butterfly type air-fuel mixture throttle valve 21 is provided in the carburetor 20, and can rotate around a valve shaft 22 so as to control a flow rate of an air-fuel mixture. An opening degree of the butterfly type air-fuel mixture throttle valve 21 is controlled by an operation lever 29 as shown in FIG. 2. The operation lever 29 is operated by a carburetor cable (not shown) or the like. Further, as shown in FIG. 2, a cam plate 28 is attached to an end portion of a valve shaft 27 of the rotary valve, and a cam groove 28c is formed in the cam plate 28. Further, a spring 46 is arranged as shown in FIG. 6 in the valve shaft 27, and energizes the valve shaft 27 or the cam plate 28 in a direction of closing the rotary valve 35.

A lever 23 is attached to the valve shaft 22 of the air-fuel mixture throttle valve 21, and a contact element 24 engaging with a cam groove 28c of the cam plate 28 is arranged in the lever 23. Further, a spring 45 is arranged as shown in FIG. 6 in the valve shaft 22, and energizes the valve shaft 22 or the lever 23 in a direction of closing the air-fuel mixture throttle valve 21. The spring 45 arranged in the valve shaft 22 can be arranged in a side of an operation lever 29 shown in FIG. 2, in place of being arranged in a side of the lever 23. A cam mechanism serving as the transmissible connecting mechanism is structured by the cam plate 28 and the lever 23.

It is possible to interlock and drive the rotary valve 35 serving as the lead air control valve and the air-fuel mixture throttle valve 21 of the carburetor 20, by the cam mechanism mentioned above, and the structure is made such as to control respective throttle amounts, that is, opening degrees. In this case, an operation of the transmissible connecting mechanism will be in detail described below with reference to FIGS. 2 to 5.

Next, a description will be given of an operation of the stratified scavenging two-cycle engine 1. In the case that the air-fuel mixture compressed in a cylinder chamber A is ignited by a spark plug 5 at a top dead center of the piston 3 shown in FIG. 1, the air-fuel mixture is exploded so as to push down the piston 3.

At this time, a lead air purified by the air cleaner 25 is filled in the scavenging port 16 and the scavenging flow path 18. Further, an air-fuel mixture in which a fuel and an air purified by the air cleaner 25 are mixed in the carburetor 20 is filled in the crank chamber 7.

When the piston 3 moves downward, the intake port 15 is first closed, and the air-fuel mixture within the crank chamber 7 is compressed. In accordance with the downward movement of the piston 3, the exhaust port 10 is next opened, and the combustion gas is discharged to an external portion through the exhaust flow path 11 via the muffler 12. Subsequently, the scavenging port 16 is opened, and the lead air flows into the cylinder chamber A from the scavenging port 16 on the basis of a pressure of the compressed air-fuel mixture within the crank chamber 7 so as to discharge the combustion gas left in the cylinder chamber A from the exhaust port 10.

Following to the inflow of the lead air into the cylinder chamber A, the air-fuel mixture within the crank chamber 7 flows into the cylinder chamber A, however, when the air-fuel mixture flows into the cylinder chamber A, the piston 3 is in a state of moving upward so as to close the exhaust port 10. Accordingly, it is possible to prevent a matter that the air-fuel mixture is discharged to the external portion as it is, that is, a so-called short circuiting phenomenon, it is possible to reduce an amount of hydrocarbon contained in the exhaust gas, and it is possible to reduce a dissipation of the fuel.

An amount of the air-fuel mixture passing through the carburetor 20 is controlled by the air-fuel mixture throttle valve 21, and an amount of the lead air is controlled by the rotary valve 35. Since the throttle amounts, that is, the opening degrees of the air-fuel mixture throttle valve 21 and the rotary valve 35 are controlled in an interlocking manner by the transmissible connecting mechanism, it is possible to always keep a balance between the amount of the air-fuel mixture and the amount of the lead air, and it is possible to execute a combustion under an optimum state.

Next, a description will be given of an operation of a transmissible connecting mechanism with reference to FIGS. 2 to 5. As shown in FIGS. 3 and 5, the valve shaft 27 of the lead air control valve and the valve shaft 22 of the air-fuel mixture throttle valve 21 are arranged so as to form an angle. Accordingly, it is possible to increase the number of the lead air pipe line, for example, by arranging a plurality of rotary valves 35 along the direction of the valve shaft 27 in FIG. 3, and it is possible to increase the number of the lead air pipe line which can be integrally controlled so as to be opened and closed by the valve shaft 27 without increasing the structure area. Therefore, it is possible to further reduce the exhaust gas component.

As shown in FIG. 2, the cam plate 28 serving as the cam member and the lever 23 are attached respectively to the valve shaft 27 of the lead air control valve and the valve shaft 22 of the air-fuel mixture throttle valve 21 which are arranged so as to form the angle. Further, the valve shaft 27 and the cam plate 28, the valve shaft 22 and the lever 23 can respectively integrally rotate. As shown in FIG. 3, a spring 46 energizing the lead air control valve in the valve closing direction is arranged in the valve shaft 27, and a spring 45 energizing the air-fuel mixture throttle valve in the valve closing direction is arranged in the valve shaft 22.

A cam groove 28c having an open apical end portion is formed in the cam plate 28 attached to the valve shaft 27 of the lead air control valve. Fork-shaped cam surfaces 28a and 28b are respectively formed in an inner surface of the cam groove 28c. A cam surface formed in the cam plate 28 can be constituted by a cam surface formed in a profile portion of the cam plate 28, or the cam groove 28c shown in FIG. 2. Further, a shape of the cam groove can be formed as a cam groove in which an apical end portion is not open but is closed.

The lever 23 is attached to the valve shaft 22 of the air-fuel mixture throttle valve 21, and the contact element 24 is arranged near an end of the lever 23. The contact element 24 can be structured such that a pin or a rotation roll is attached to a portion near the end portion of the lever 23. Further, it is possible to use a bent portion formed by bending the apical end portion of the lever, an inflected portion integrally formed with the lever or the like as the contact element 24.

It is possible to reduce a sliding resistance with respect to the cam surfaces 28a and 28b with which the contact element 24 is engaged, by forming a shape of the contact element 24 such as a cylinder shape, a spherical shape, a rotation roll shape or the like so that the contact element 24 and the cam surfaces 28a and 28b are brought into line contact or point contact with each other.

FIGS. 2 and 3 shows a state in which the lead air control valve and the air-fuel mixture throttle valve 21 are arranged in a home position state, in which the contact element 24 and the cam surface 28b are placed in a non-contact state. As shown in FIG. 3, the portion near the apical end portion of the contact element 24 is arranged in a state of being inserted into the cam groove 28c.

When the valve shaft 22 is rotated in a counterclockwise direction on the basis of the operation of the operation lever 29 shown in FIG. 2, the valve shaft 27 of the lead air control valve is rotated in an interlocking manner after the valve shaft 22 is rotated at a predetermined amount in a counterclockwise direction. In other words, it is possible to rotate the valve shaft 22 of the air-fuel mixture throttle valve 21 of the carburetor 20 at a predetermined amount before rotating the valve shaft 27 of the lead air control valve in an interlocking manner on the basis of a gap formed between the contact element 24 and the cam surface 28b of the cam grove 28c. It is possible to control the inflow of the lead air into the cylinder at the idling time or the starting time of the engine on the basis of the gap formed between the contact element 24 and the cam surface 28b.

In this case, the description is given on the assumption that the air-fuel mixture throttle valve 21 is opened on the basis of the rotation of the valve shaft 22 in the counterclockwise direction in FIG. 2, and the lead air control valve is opened on the basis of the rotation of the valve shaft 27 in a clockwise direction. Further, the operation lever 29 can be operated by a carburetor cable (not shown) or the like.

When the valve shaft 22 of the air-fuel mixture throttle valve 21 is rotated from the state in FIGS. 2 and 3, the cam plate 28 is rotated against the spring 46 on the basis of the contact between the contact element 24 arranged in the lever 23 and the cam surface 28b, and rotates the lead air control valve in the valve opening direction via the valve shaft 27. A state in which the lead air control valve is rotated in the valve opening direction is shown in FIGS. 4 and 5. FIGS. 4 and 5 show a state in which the valve shaft 22 is rotated at about 75 degree and the valve shaft 27 is rotated at about 80 degree, however, the angles of rotation of the valve shaft 22 and the valve shaft 27 are not respectively limited to about 75 degree and about 80 degree, but the angle or rotation necessary for opening the valve can be set to an optional angle.

As shown in FIG. 5, when the valve shaft 22 is rotated at about 75 degree, the valve shaft 22 is brought into contact with the cam surface 28b at about an intermediate position of the contact element 24 provided in the lever 23. Further, at this time, the cam groove 28c of the cam plate 28 provided in the valve shaft 27 becomes in a downward open state, and it is known that the cam groove 28c in FIG. 2 is rotated in a clockwise direction at about 80 degree from a state open right sideways.

As mentioned above, since the valve shaft 22 and the valve shaft 27 form the angle, the locus of the contact portion between the contact element 24 of the lever 23 provided in the valve shaft 22 and the cam surface 28b of the cam plate 28 provided in the valve shaft 27 draws a three-dimensional locus. In the first embodiment according to the present invention, since the length of the contact element 24 is formed so as to be extended in parallel to the axis of the valve shaft 22, it is possible to maintain the state in which the contact element 24 is always brought into contact with the cam surface 28b.

Further, since the cam plate 28 and the lever 23 are in the layout relation in which both the elements are not interfered on the basis of the rotation of the cam plate 28 and the rotation of the lever 23, there is not generated a matter that the rotation of the valve shaft 22 is obstructed by the collision between the cam plate 28 and the lever 23. Accordingly, it is possible to smoothly transmit and connect the rotation of the lever 23 as the rotation of the cam plate 28. Further, the valve shaft 27 is rotated by the rotation of the cam plate 28, and can make the air cleaner 25 and the scavenging port 16 in the communication state by rotating the rotary valve 35 serving as the lead air control valve shown in FIG. 1.

It is possible to interlock the opening degree of the rotary valve 35 with the opening degree of the air-fuel mixture throttle valve 21 of the carburetor 20 by the cam mechanism constituted by the cam plate 28, the lever 23 and the contact element 24, even if the valve shaft 27 of the lead air control valve and the valve shaft 22 of the air-fuel mixture throttle valve 21 are arranges while forming the angle. It is possible to always keep the balance between the amount of the air-fuel mixture and the amount of the lead air, and it is possible to execute the combustion control in an optimum state.

In the meantime, in the description of the first embodiment, the description is given on the assumption that the state in FIGS. 2 and 3 is the home position state, and the state in FIGS. 3 and 4 is the valve open state, however, it is possible to set the state in FIGS. 2 and 3 as the valve open state, and set the state in FIGS. 4 and 5 as the home position state.

When it is intended to return and rotate the lead air control valve and the air-fuel mixture throttle valve 21 in a valve closing direction, that is, return and rotate the valve shaft 22 in a clockwise direction in FIG. 4 by operating the operation lever 29 shown in FIGS. 2 and 3 from a full open state of the lead air control valve and the air-fuel mixture throttle valve 21 shown in FIGS. 4 and 5, the cam plate 28 and the lever 23 are rotated on the basis of respective returning forces of a spring 46 provided in the valve shaft 27 and a spring 45 provided in the valve shaft 22 shown in FIGS. 3 and 5, and it is possible to rotate the rotary valve 35 and the air-fuel mixture throttle valve 21 in a valve closing direction, that is, return to the home position state.

At this time, for example, even in the case that a foreign particle or the like enters into the valve shaft 22 and the valve shaft 22 is not normally operated, the contact element 24 is pressed by the cam surface 28b of the cam plate 28 returned and rotated by the spring 46, whereby it is possible to rotate the lever 23 in the clockwise direction in FIG. 4. On the contrary, in the case that the foreign particle or the like enters into the valve shaft 27 and the valve shaft 27 is not normally operated, it is possible to rotate the cam plate 28 in the counterclockwise direction in FIG. 4 on the basis of the pressing of the cam surface 28a by the contact element 24.

Even in the case that, for example, the foreign particle or the like enters into the valve shaft 27, the valve shaft 27 is not normally operated, and the cam plate 28 is not rotated even on the basis of the pressing to the cam surface 28a by the contact element 24, that is, the valve shaft 27 stops in a state in which the lead air control valve is open, the opening degree of the air-fuel mixture throttle valve 21 of the carburetor 20 can maintain a proper opening degree in correspondence to the opening degree of the lead air control valve. Accordingly, it is possible to supply a proper fuel to the cylinder. Therefore, it is possible to prevent a damage applied to the engine which is generated by an overheat or an over speed of the engine.

Further, for example, in the case that the foreign particle or the like enters into the valve shaft 22, the valve shaft 22 is not normally operated, and the lever 23 is not rotated by the pressing of the cam surface 28b, it is possible to maintain the opening degree of the air-fuel mixture throttle valve 21 of the carburetor 20 to a proper opening degree corresponding to the opening degree of the lead air control valve in the same manner as the case mentioned above.

Accordingly, it is possible to forcibly drive the valve shaft 22 and the valve shaft 27 in an interlocking manner in the valve opening direction and the valve closing direction of the valve shaft 22, and even in the case that the valve shafts 22 and 27 are not normally operated, it is possible to avoid an abnormal state of the engine. Further, it is possible to utilize the respective return spring forces of both the springs 45 and 46 as a resultant force without making the return spring forces of the springs 45 and 46 arranged in the valve shafts 22 and 27 strong. Accordingly, it is possible to forcibly drive the valve shaft 22 and the valve shaft 27 in an interlocking manner without increasing an operation force of the operation lever 29 shown in FIG. 2, and even in the case that the valve shafts 22 and 27 are not normally operated, it is possible to avoid an abnormal state of the engine.

Second Embodiment

FIGS. 6 and 7 show plan views of a transmissible connecting mechanism according to a second embodiment. FIG. 6 shows a home position in which the lead air control valve and the air-fuel mixture throttle valve 21 are in the valve closing state, and FIG. 7 shows a valve open state of the lead air control valve and the air-fuel mixture throttle valve 21. In this case, FIG. 6 can be set to the valve closing position and FIG. 7 can be set to the home position state.

In the second embodiment, a description will be given by using an example in which the cam plate 28 is energized by a spring 46' in a direction coming close to the lever 23, however, the structure can be made such that the lever 23 is energized in a direction toward the cam plate 28, or the lever 23 and the cam plate 28 are respectively energized in a direction of coming close to each other.

The second embodiment is provided with the same structures as those of the first embodiment except the structure in which the cam plate is energized toward the lever 23 and the structure in which a projection 40 is formed in the contact portion between the cam plate 28 and the lever 23. Accordingly, a description of the member will be omitted by using the same reference numerals as those used in the first embodiment. Further, since operations and effects in the second embodiment can achieve the same operations and effects as the operations and effects which can be achieved by the first embodiment, a description will be omitted except the peculiar operations and effects to the second embodiment.

In FIGS. 6 and 7, the spring 46' achieves two functions of a tensile spring and a torsional spring. When the cam plate 28 attached to the valve shaft 27 is energized to the lever 23 side by the spring 46', the projection 40 having a semispherical shape or the like and formed in a surface in the same plate 28 side of the lever 23 is brought into contact with the cam plate 28. The shape of the projection 40 can employ a shape such as a hog-backed shape or the like in addition to the semispherical shape.

Further, the projection 40 is not limited to the semispherical shape and the hog-backed shape, but can employ various shapes and materials obtained by appropriately combining such shapes and materials that can reduce a slidable resistance between the lever 23 and the cam plate 28 such as a point contact, a line contact or the like. Further, the projection 40 can be formed in the cam plate 28 side without being formed in the lever 23 side.

When the valve shaft 22 is rotated by operating the operation lever 29 so as to be rotated to a state shown in FIG. 7, the cam plate 28 slides in a leftward direction in FIG. 6 on the basis of the pressing force by the projection 40, and sets the spring 46' in a tension state. Further, the spring 46' can accumulate a torsion force on the basis of the rotation of the cam plate 28 by the contact element 24. Accordingly, the cam plate 28 and the lever 23 can be always kept in contact via the projection 40.

In the second embodiment, since it is possible to reduce a protruding amount of the valve shaft 27 in comparison with the first embodiment, it is possible to make the structure area of the engine smaller.

INDUSTRIAL APPLICABILITY

The present invention provides the transmissible connecting mechanism which can drive in the interlocking manner the lead air control valve and the air-fuel mixture throttle valve shaft of the carburetor of the stratified scavenging two-cycle engine in which the shafts are arranged so as to form the angle, however, the technical idea of the present invention can be applied to the apparatus or the like to which the technical idea of the present invention can be applied.

The invention claimed is:

1. A transmissible connecting mechanism between valve shafts forming an angle, the transmissible connecting mechanism interlocking and driving the both valve shafts, which are respectively a lead air control valve shaft and an air-fuel mixture throttle valve shaft of a carburetor in a stratified scavenging two-cycle engine, wherein one of the valve shafts is a drive shaft and the other valve shaft is a driven shaft, wherein the drive shaft and the driven shaft are disposed in a configuration to form an angle between the drive shaft and the driven shaft, the transmissible connecting mechanism is arranged so as to be integrally rotatable with the drive shaft and the driven shaft respectively, and is provided with a pair of first cam member and a second cam member which are transmitted to each other in a contact manner, and a part of a contact surface of the first cam member and a part of a contact surface of the second cam member are always maintained in a contact state at a time of a contact transmission of the first cam member and the second cam member.

2. The transmissible connecting mechanism between valve shafts forming an angle according to claim 1, wherein one cam member of the first cam member and the second cam member comprises a cam plate having a cam surface, the other cam member comprises a lever having a contact element which is brought into contact with the cam surface.

3. The transmissible connecting mechanism between valve shafts forming an angle according to claim 1 or 2, wherein at least one cam member of the first cam member and the second cam member is structured such that the contact surface with the other cam member is extended in parallel to the valve shaft in which the one cam member is arranged.

4. The transmissible connecting mechanism between valve shafts forming an angle according to claim 1 or 2, wherein at least one cam member of the first cam member and the second cam member is slidably urged along the drive shaft or the driven shaft in which the first cam member or the second cam member is arranged, and toward the other second cam member or the first cam member.

* * * * *